(12) United States Patent
Nagahori et al.

(10) Patent No.: US 12,535,675 B2
(45) Date of Patent: Jan. 27, 2026

(54) SENSOR DEVICE

(71) Applicant: PIONEER CORPORATION, Tokyo (JP)

(72) Inventors: Yohei Nagahori, Kawagoe (JP); Ryoya Sato, Kawagoe (JP)

(73) Assignee: PIONEER CORPORATION, Tokyo (JP)

( * ) Notice: Subject to any disclaimer, the term of this patent is extended or adjusted under 35 U.S.C. 154(b) by 903 days.

(21) Appl. No.: 17/783,607

(22) PCT Filed: Dec. 2, 2020

(86) PCT No.: PCT/JP2020/044820
§ 371 (c)(1),
(2) Date: Jun. 8, 2022

(87) PCT Pub. No.: WO2021/117571
PCT Pub. Date: Jun. 17, 2021

(65) Prior Publication Data
US 2023/0003844 A1 Jan. 5, 2023

(30) Foreign Application Priority Data
Dec. 9, 2019 (JP) .................. 2019-221929

(51) Int. Cl.
*G01S 7/48* (2006.01)
*G01S 7/481* (2006.01)
(Continued)

(52) U.S. Cl.
CPC ........ *G02B 26/0833* (2013.01); *G01S 7/4813* (2013.01); *G01S 7/4817* (2013.01); *G01S 7/4865* (2013.01); *G01S 17/10* (2013.01)

(58) Field of Classification Search
None
See application file for complete search history.

(56) References Cited

U.S. PATENT DOCUMENTS 10,352,654 B2   7/2019   Costet et al.
10,641,871 B2   5/2020   Higashi et al.
(Continued)

FOREIGN PATENT DOCUMENTS

JP   H01-200699 A   8/1989
JP   H06-160957 A   6/1994
(Continued)

OTHER PUBLICATIONS

Jun. 2, 2015, InternetArchive [online], Feb. 6, 2015 (Feb. 6, 2015) publication date, [Jan. 28, 2021] (retrieval date Jan. 28, 2021)], Internet <https://web.archive.org/web/20150602151027/http:/www.hokuyo-aut.co.jp/search/single.php?serial=146>, in particular, product photo, product summary, dimensions, non-official translation ("Distance Data Output, UTM-30LX-EW overview", Hokuyo Automatic Co., Ltd.) 4 pages.

(Continued)

*Primary Examiner* — Hovhannes Baghdasaryan
(74) *Attorney, Agent, or Firm* — Procopio, Cory, Hargreaves & Savitch LLP

(57) ABSTRACT

An outer surface of a casing (100) is provided with a first shape portion (152) and a second shape portion (154). The first shape portion (152) and the second shape portion (154) are engageable with other shape portions located outside the casing (100). The first shape portion (152) and the second shape portion (154) are aligned on the same straight line as a virtual straight line passing through the center of a field of view when viewed from a direction perpendicular to a direction in which the field of view expands. Alternatively, the first shape portion (152) and the second shape portion (154) may be aligned along a direction parallel to this straight line when viewed from the direction perpendicular to the direction in which the field of view expands.

6 Claims, 9 Drawing Sheets

(51) Int. Cl.
G01S 7/4865 (2020.01)
G01S 17/10 (2020.01)
G02B 26/08 (2006.01)

(56) References Cited

U.S. PATENT DOCUMENTS

| | | |
|---|---|---|
| 10,875,481 B2 | 12/2020 | Kishi |
| 2006/0112576 A1 | 6/2006 | Lu |
| 2018/0275253 A1 | 9/2018 | Higashi et al. |
| 2019/0049217 A1 | 2/2019 | Costet et al. |
| 2019/0351857 A1 | 11/2019 | Kishi |
| 2020/0348397 A1 | 11/2020 | Yamamoto |

FOREIGN PATENT DOCUMENTS

| | | | |
|---|---|---|---|
| JP | 2009-217046 A | 9/2009 | |
| JP | 2012-088296 A | 5/2012 | |
| JP | 2017-083251 A | 5/2017 | |
| JP | 2019-128236 A | 8/2019 | |
| JP | 2019-152219 A | 9/2019 | |
| JP | 2002-031685 A | 1/2022 | |
| WO | 2018-146992 A1 | 8/2018 | |
| WO | 2019-036443 A1 | 2/2019 | |

OTHER PUBLICATIONS

International Search Report issued in JP Application No. PCT/JP2020/044820, dated Feb. 22, 2021, 2 pages.

SENSOR DEVICE

CROSS-REFERENCE TO RELATED APPLICATIONS

This application is a U.S. National Stage entry of PCT Application No: PCT/JP2020/044820 filed Dec. 2, 2020.

TECHNICAL FIELD

The present invention relates to a sensor device.

BACKGROUND ART

In recent years, an optical device (for example, light detection and ranging (LiDAR) or radio detection and ranging (RADAR)) having a movable reflection portion such as a micro electro mechanical systems (MEMS) mirror has been developed. The movable reflection portion of the optical device scans an object located outside the optical device with an electromagnetic wave such as infrared rays.

For example, as disclosed in Patent Document 1, an optical device maybe accommodated in a casing. The optical device in Patent Document 1 has a light projecting portion, a scanning portion, and a light receiving portion. These light projecting portion, scanning portion, and light receiving portion are accommodated in the casing.

RELATED DOCUMENT

Patent Document

[Patent Document 1] Japanese Unexamined Patent Publication No. 2019-128236

SUMMARY OF THE INVENTION

Technical Problem

In a case where an object is scanned by an optical device, it is desirable that a field of view of the optical device is easily positioned.

One example of an object of the present invention is to easily position a field of view of an optical device.

Solution to Problem

The invention according to claim 1 is a sensor device including a casing provided with a window portion; and an optical device accommodated in the casing, the optical device scanning an object with an electromagnetic wave transmitted through the window portion, the optical device having a field of view that expands along at least one direction, in which an outer surface of the casing is provided with a first shape portion that is a recess or a protrusion and a second shape portion that is a recess or a protrusion, and when viewed from a direction perpendicular to the one direction, the second shape portion is aligned with the first shape portion on the same straight line as a virtual straight line passing through a center of the field of view of the optical device, or along a direction parallel to the virtual straight line.

The invention according to claim 2 is a sensor device including a casing provided with a window portion; and an optical device accommodated in the casing, the optical device scanning an object with an electromagnetic wave transmitted through the window portion by using a movable reflection portion swingable around at least one axis, in which an outer surface of the casing is provided with a first shape portion that is a recess or a protrusion and a second shape portion that is a recess or a protrusion, and when viewed from an extension direction of the one axis of the movable reflection portion, the second shape portion is aligned with the first shape portion on the same straight line as a virtual straight line through which the electromagnetic wave reflected by the movable reflection portion at a swing angle of 0 degrees passes, or along a direction parallel to the virtual straight line.

DESCRIPTION OF EMBODIMENTS

Figure 1:
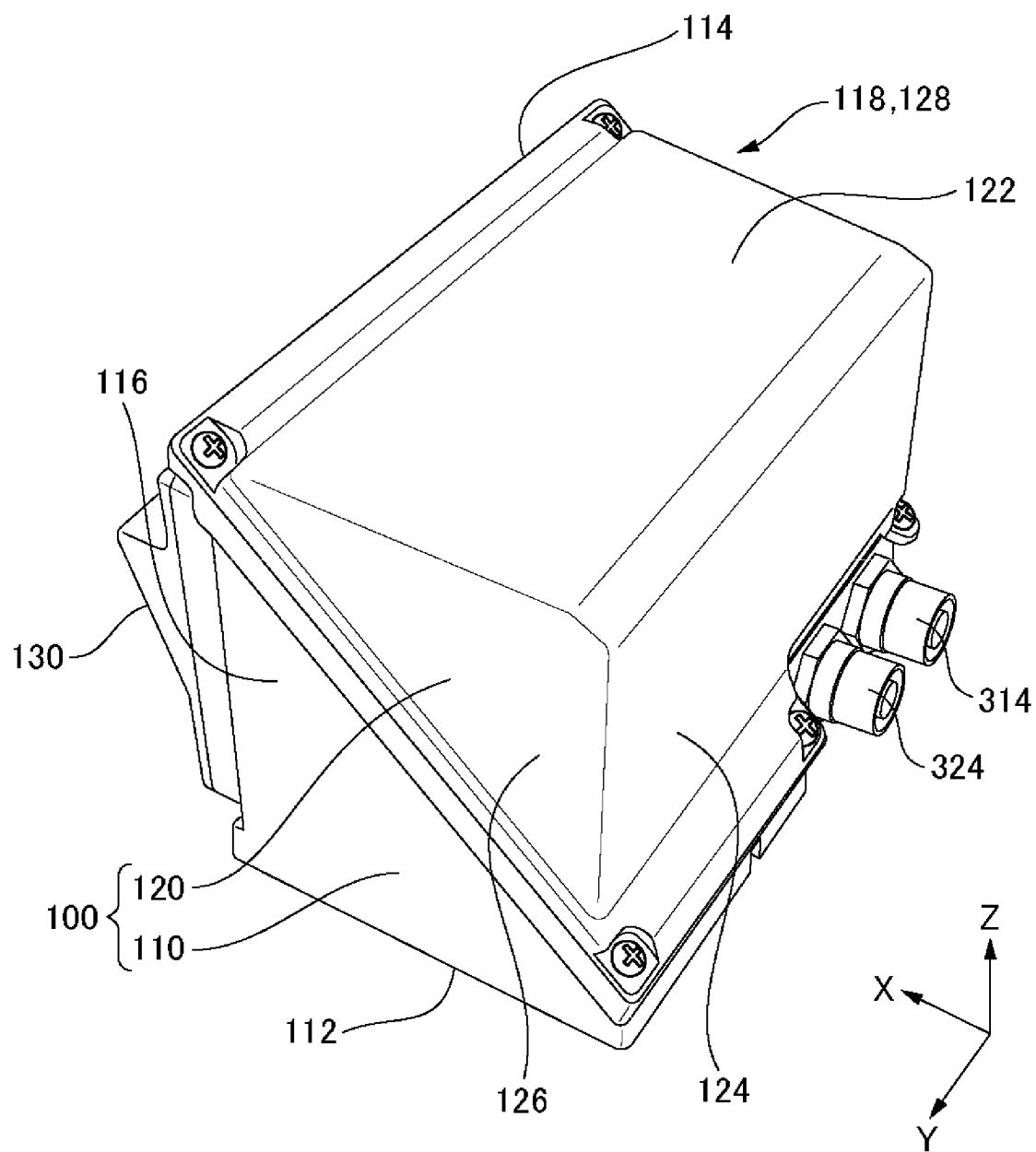
FIG. 1 is a perspective view from above and behind a sensor device according to an embodiment.

Hereinafter, embodiments of the present invention will be described with reference to the drawings. In all drawings, similar constituents are given the same reference numerals, and description thereof will not be repeated as appropriate.

Figure 2:
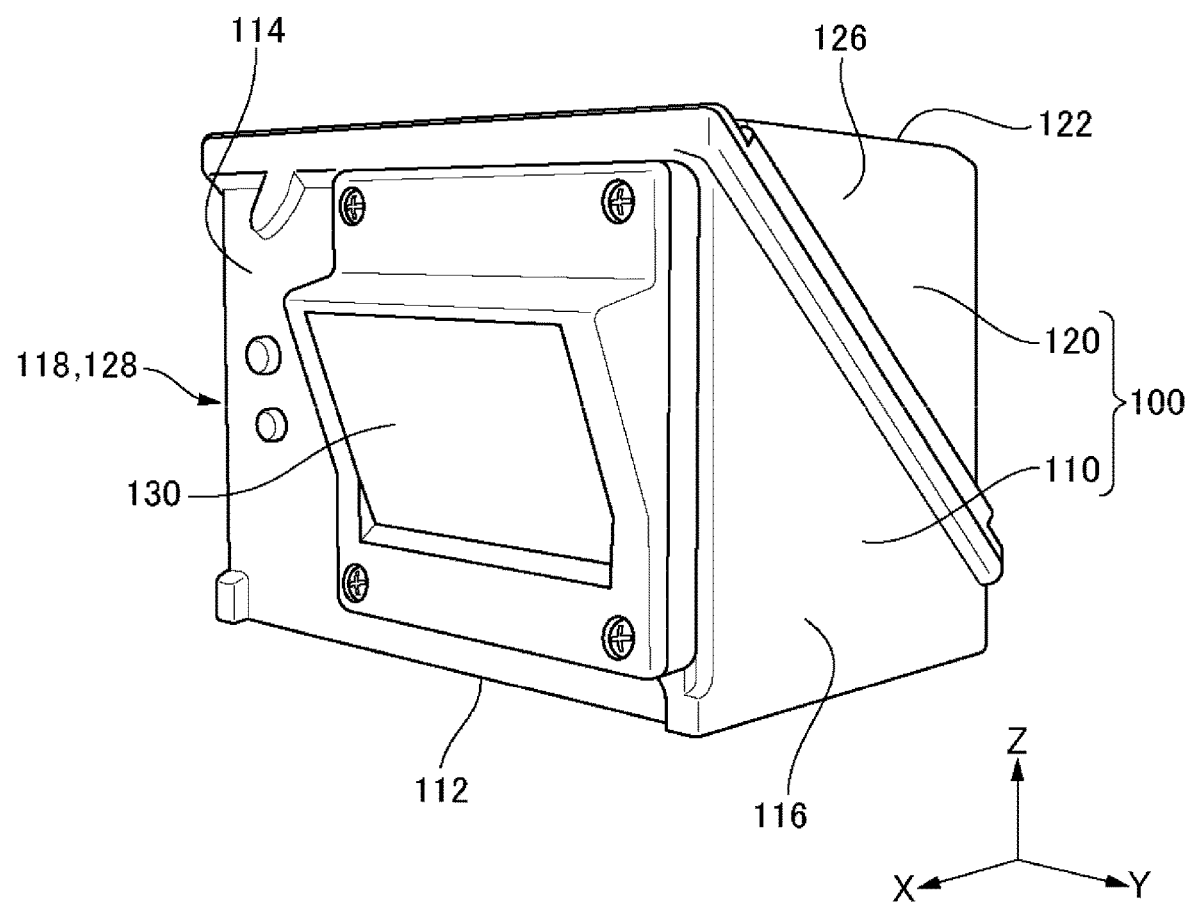
FIG. 2 is a perspective view from the front of the sensor device shown in FIG. 1.
Figure 3:
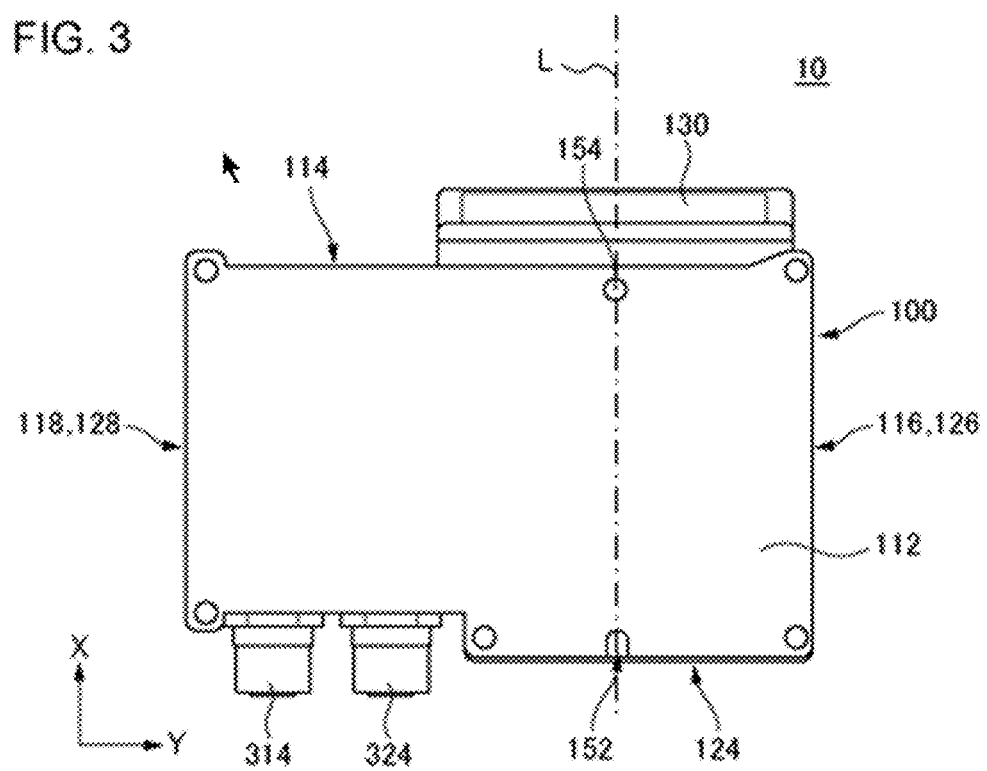
FIG. 3 is a bottom view of the sensor device shown in FIG. 1.
Figure 4:
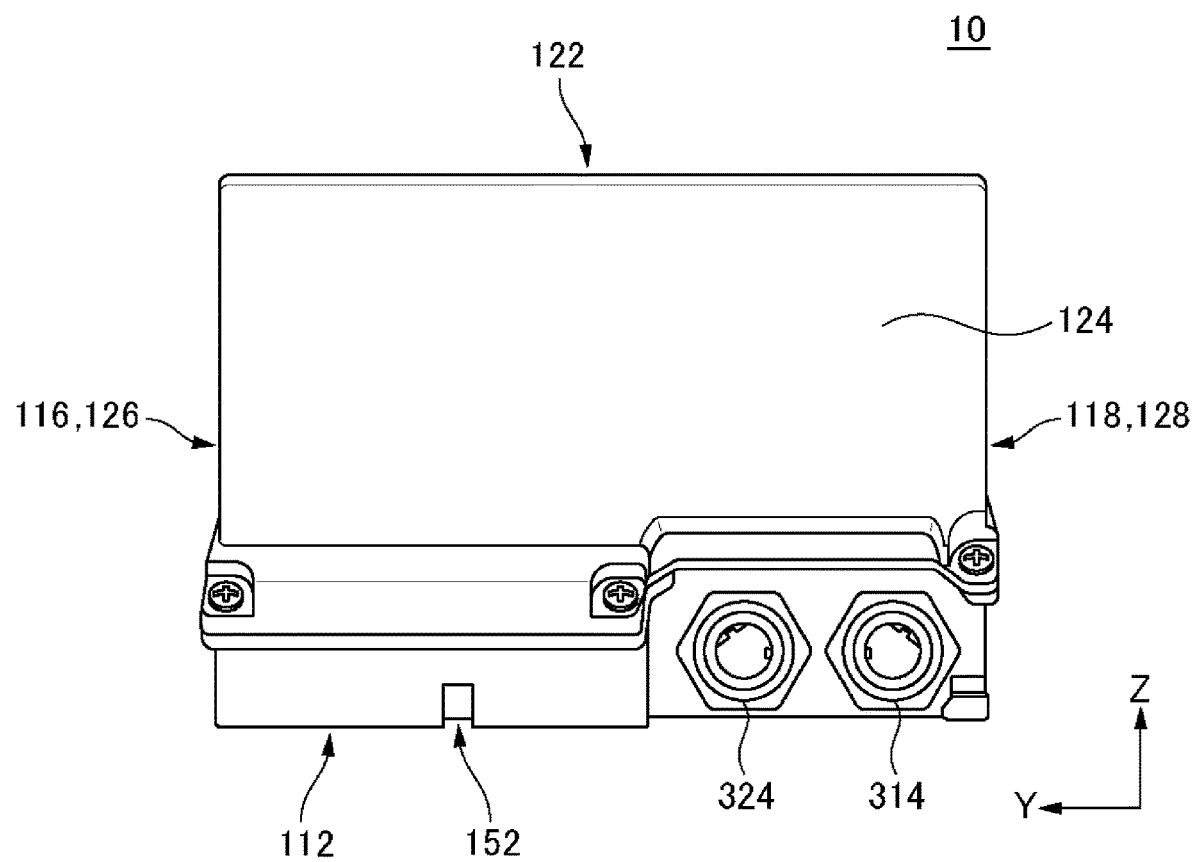
FIG. 4 is a rear view of the sensor device shown in FIG. 1.
Figure 5:
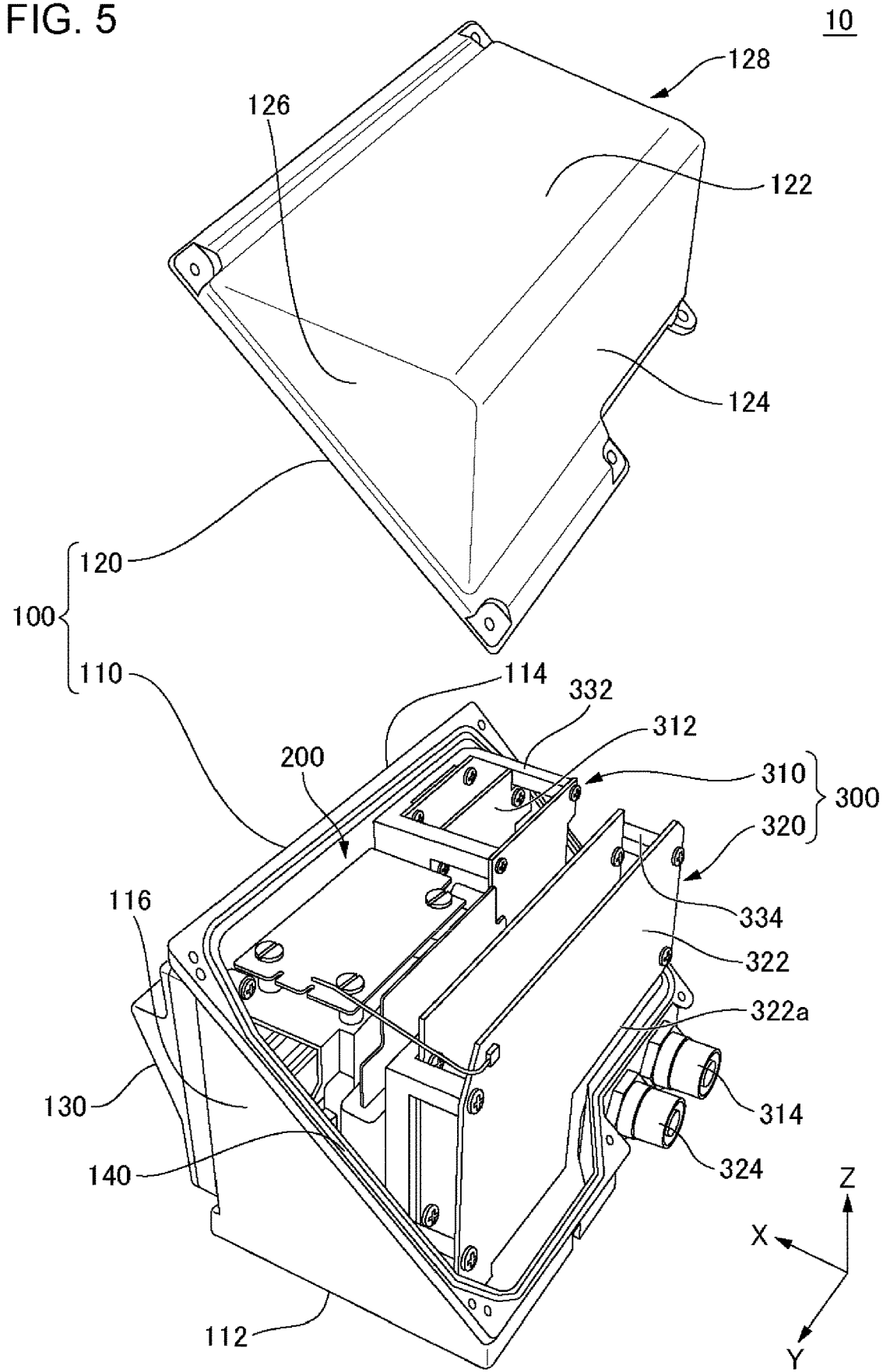
FIG. 5 is an exploded perspective view of the sensor device shown in FIG. 1.
Figure 6:
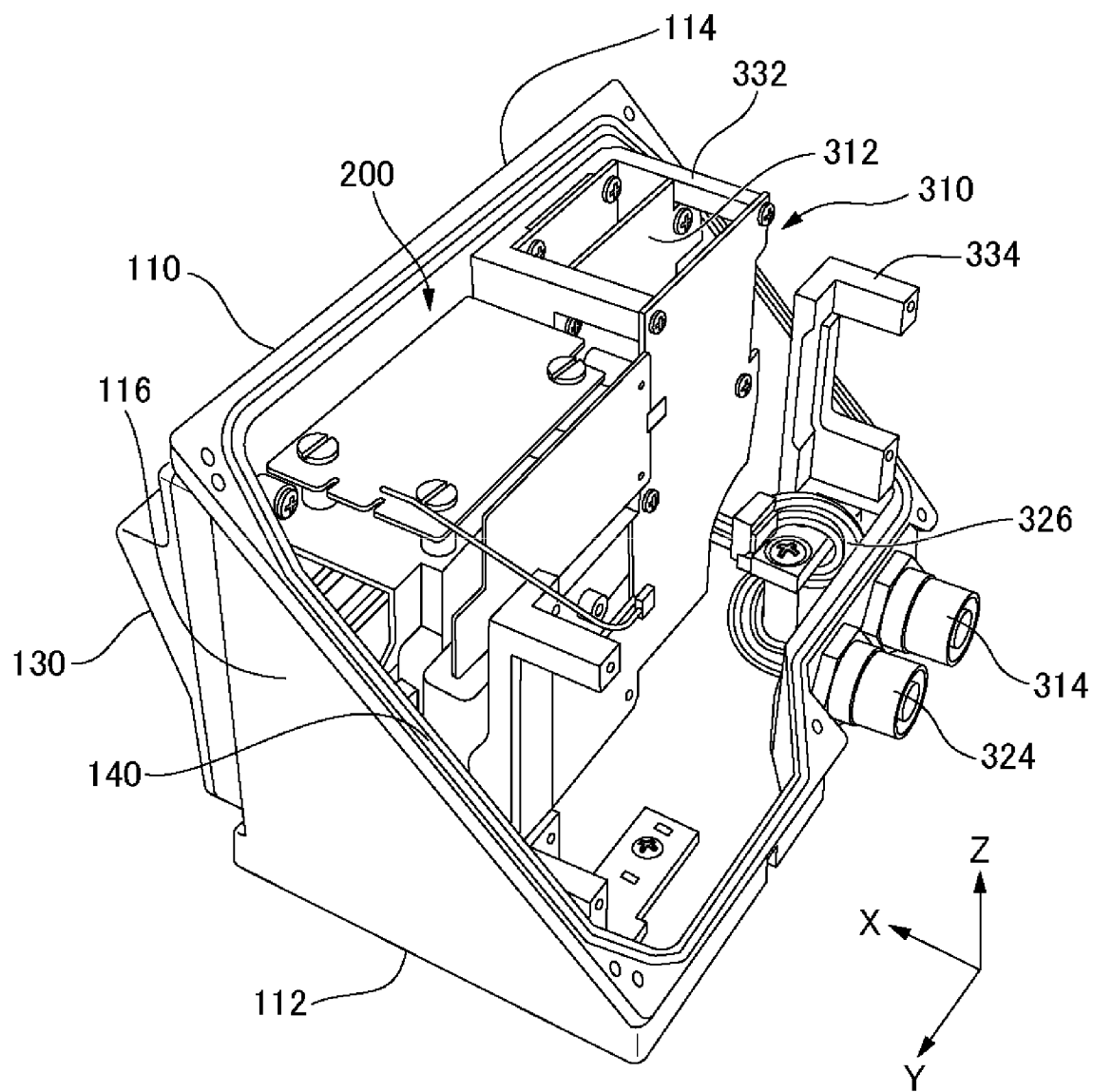
FIG. 6 is a diagram with a second portion of a casing and a controller of an electronic device removed from FIG. 5.
Figure 7:
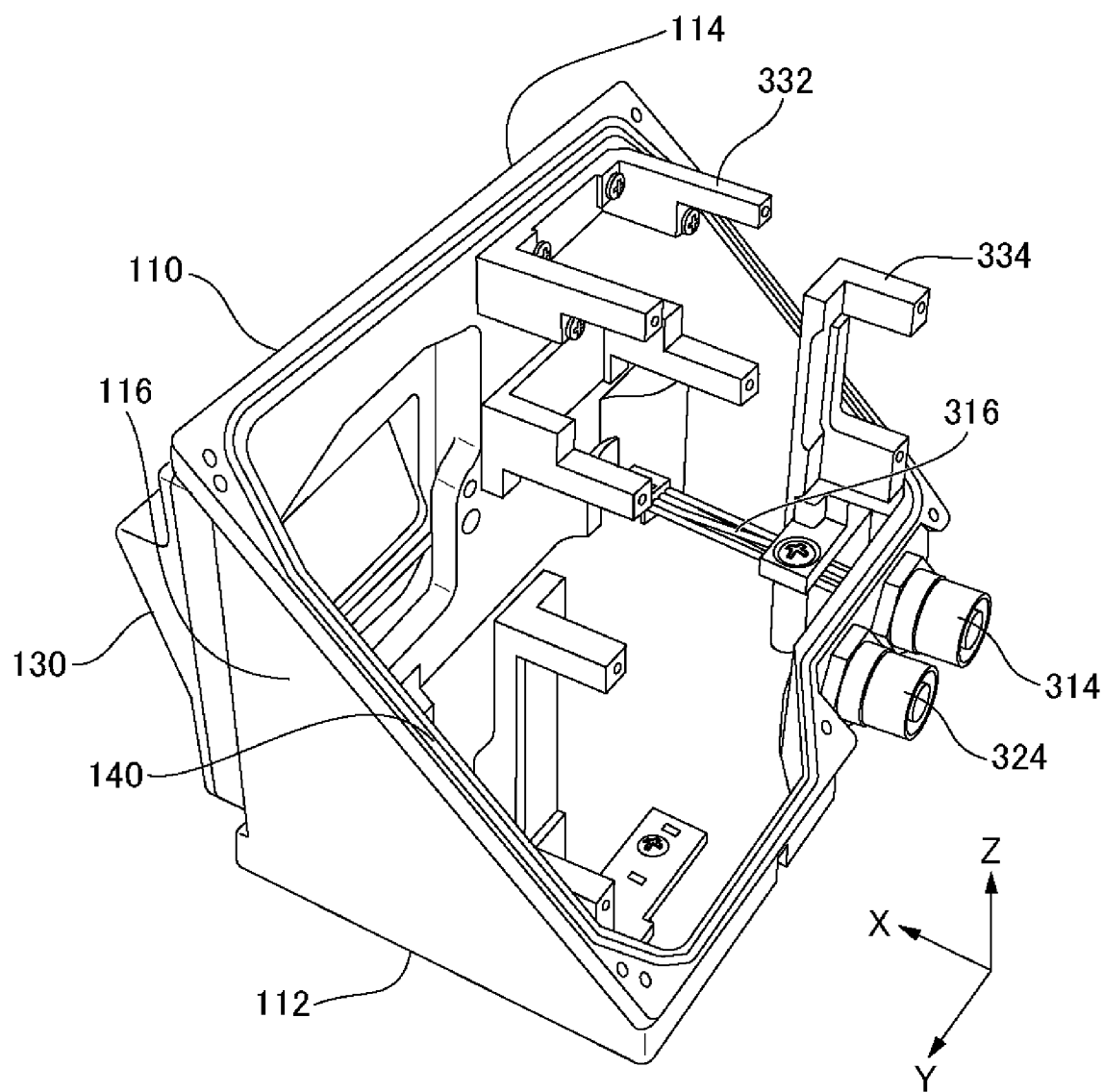
FIG. 7 is a diagram with an optical device, a power supply portion of an electronic device, and a control wiring removed from FIG. 6.

FIG. 1 is a perspective view from above and behind a sensor device 10 according to the embodiment. FIG. 2 is a perspective view from the front of the sensor device 10 shown in FIG. 1. FIG. 3 is a bottom view of the sensor device 10 shown in FIG. 1. FIG. 4 is a rear view of the sensor device 10 shown in FIG. 1. FIG. 5 is an exploded perspective view of the sensor device 10 shown in FIG. 1. FIG. 6 is a diagram with a second portion 120 of a casing 100 and a controller 320 of an electronic device 300 removed from FIG. 5. FIG. 7 is a diagram with an optical device 200, a power supply portion 310 of the electronic device 300, and a control wiring 326 removed from FIG. 6.

In FIGS. 1 to 7, a first direction X is a front-rear direction of the sensor device 10. A positive direction (a direction indicated by an arrow indicating the first direction X) of the first direction X is the front direction of the sensor device 10. A negative direction (a direction opposite to the direction indicated by the arrow indicating the first direction X) of the first direction X is a rear direction of the sensor device 10. A second direction Y intersects the first direction X, and is specifically orthogonal to the first direction X. The second direction Y is the left-right direction of the sensor device 10. A positive direction (a direction indicated by an arrow indicating the second direction Y) of the second direction Y is the right direction when viewed from the front of the sensor device 10 (the positive direction of the first direction X). A negative direction (a direction opposite to the direction indicated by the arrow indicating the second direction Y) of the second direction Y is the left direction when viewed from the front of the sensor device 10 (the positive direction of the first direction X). A third direction Z intersects both of the first direction X and the second direction Y, and is specifically orthogonal to both of the first direction X and the second direction Y. The third direction Z is the up-down direction of the sensor device 10. A positive direction (a direction indicated by an arrow indicating the third direction Z) of the third direction Z is the up direction of the sensor device 10. A negative direction (a direction opposite to the direction indicated by the arrow indicating the third direction Z) of the third direction Z dire stion-X is the down font direction of the sensor device 10.

The sensor device 10 includes a casing 100, an optical device 200 and an electronic device 300, a power supply terminal 314, and a control terminal 324.

The casing 100 has a first portion 110 (lower portion) and a second portion 120 (upper portion). In the present embodiment, the first portion 110 functions as an accommodation member with a space in the first portion 110 (casing 100) open upward of the casing 100 (the positive direction of the third direction Z) and rearward of the casing 100 (the negative direction of the first direction X). On the other hand, the second portion 120 functions as a cover member that closes the space opened by the first portion 110. The second portion 120 is fixable to the first portion 110 via a fixing tool such as a screw.

The first portion 110 includes a first surface 112 (bottom surface), a first side surface 114 (front side surface), a second side surface 116 (right side surface), and a third side surface 118 (left side surface). The first side surface 114 is directed sideways (forward, that is, the positive direction of the first direction X) with respect to the direction in which the first surface 112 is directed (downward, that is, the negative direction of the third direction Z). The first side surface 114 is provided with a window portion 130. The second side surface 116 is directed sideways (rightward, that is, the positive direction of the second direction Y) with respect to both of the direction in which the first surface 112 is directed (downward, that is, the negative direction of the third direction Z) and the direction in which the first side surface 114 is directed (forward, that is, the positive direction in the first direction X). The third side surface 118 is directed to the opposite side (leftward, that is, the negative direction of the second direction Y) to the direction in which the second side surface 116 is directed (rightward, that is, the positive direction of the second direction Y).

The second portion 120 includes a second surface 122 (top surface), a fourth side surface 124 (rear side surface), a fifth side surface 126 (right side surface), and a sixth side surface 128 (left side surface). The second surface 122 is directed to the opposite side (upward, that is, the positive direction of the third direction Z) to the direction in which the first surface 112 is directed (downward, that is, the negative direction of the third direction Z). The fourth side surface 124 is directed sideways (rearward, that is, the negative direction of the first direction X) with respect to the direction in which the second surface 122 is directed (downward, that is, the negative direction of the third direction Z). The fifth side surface 126 is directed in the same direction as the direction in which the second side surface 116 is directed (rightward, that is, the positive direction of the second direction Y). That is, the fifth side surface 126 is directed sideways (rightward, that is, the positive direction of the second direction Y) with respect to both of the direction in which the second surface 122 is directed (upward, that is, the positive direction of the third direction Z) and the direction in which the fourth side surface 124 is directed (rearward, that is, the negative direction of the first direction X). The sixth side surface 128 is directed in the same direction as the direction in which the third side surface 118 is directed (leftward, that is, the negative direction of the second direction Y). That is, the sixth side surface 128 is directed to the opposite side (leftward, that is, the negative direction of the second direction Y) to the direction in which the fifth side surface 126 is directed (rightward, that is, the positive direction of the second direction Y).

The optical device 200 is accommodated in the casing 100. The optical device 200 is located in the front of the space in the casing 100 (the positive direction of the first direction X) rather than in the rear of the space in the casing 100 (the negative direction in the first direction X). The optical device 200 is attached to the first portion 110 of the casing 100. However, the optical device 200 may be attached to the second portion 120 of the casing 100. The optical device 200 scans an object (not shown in FIGS. 1 to 7) present outside the sensor device 10 by using an electromagnetic wave transmitted through the window portion 130.

The first portion 110 and the second portion 120 of the casing 100 are separable obliquely from the second surface 122 side (upper side, that is, the positive direction side of the third direction Z) toward the first surface 112 side (lower side, that is, the negative direction side of the third direction Z) of the casing 100 with respect to the first surface 112 or the second surface 122 of the casing 100 from the first side surface 114 (window portion 130) side (front side, that is, the positive direction side of the first direction X) toward the opposite side (fourth side surface 124 side) (rear side, that is, the negative direction side of the first direction X) to the first side surface 114 (window portion 130). In this case, for example, compared with the case where the first portion 110 and the second portion 120 of the casing 100 are separable along the first surface 112 or the second surface 122 of the casing 100 in parallel, the space in the casing 100 is largely exposed rearward of the casing 100 (the negative direction of the first direction X) when the second portion 120 is detached from the first portion 110. Accordingly, it is easy to attach the optical device 200 to the space in the casing 100 from behind the casing 100 (the negative direction of the first direction X). Thus, it is possible to easily accommodate the optical device 200 in the casing 100.

A boundary between the first portion 110 and the second portion 120 of the casing 100 is formed along one plane (a plane oblique with respect to the first direction X or the third direction Z when viewed from the positive direction of the second direction Y). The casing 100 includes a sealing member 140 (for example, rubber) provided along the one plane between the first portion 110 and the second portion 120 of the casing 100. In this case, the sealing member 140 can be stably disposed between the first portion 110 and the second portion 120 of the casing 100 compared with a case where a boundary between the first portion 110 and the second portion 120 of the casing 100 is not along one plane, and thus it is possible to improve the waterproof property of the casing 100. However, the boundary between the first portion 110 and the second portion 120 of the casing 100 may not be formed along one plane.

The electronic device 300 has a power supply portion 310 and a controller 320. The power supply portion 310 supplies power used for driving the optical device 200 to the optical device 200. The controller 320 supplies a control signal for the optical device 200 to the optical device 200. In the present embodiment, the power supply portion 310 and the controller 320 are attached to the first portion 110 of the casing 100. However, the power supply portion 310 and the controller 320 may be attached to the second portion 120 of the casing 100.

The power supply portion 310 is located in the front of the space in the casing 100 (the positive direction of the first direction X) rather than in the rear of the space in the casing 100 (the negative direction of the first direction X). The power supply portion 310 is aligned with the optical device 200 in a direction (second direction Y) intersecting the direction (first direction X) from the first side surface 114 (window portion 130) side (frontward, that is, the positive direction of the first direction X) toward the opposite side (fourth side surface 124 side) (rearward, that is, the negative direction of the first direction X) to the first side surface 114 (window portion 130). The controller 320 is aligned with the optical device 200 and the power supply portion 310 in a direction (first direction X) from the first side surface 114 (window portion 130) side (frontward, that is, the positive direction of the first direction X) toward the opposite side (fourth side surface 124 side) (rearward, that is, the negative direction of the first direction X) to the first side surface 114 (window portion 130). The controller 320 is located in the rear of the space in the casing 100 (the negative direction of the first direction X) rather than in the front of the space in the casing 100 (the positive direction of the first direction X). In general, a space for disposing the controller 320 (for example, a control board 322 that will be described in detail later) needs to be larger than a space for disposing the power supply portion 310 (for example, a power supply board 312 that will be described in detail later). According to the present embodiment, by arranging the optical device 200 and the power supply portion 310 in the second direction Y, it is possible to secure a space for disposing the controller 320 behind the optical device 200 and the power supply portion 310 (the negative direction of the first direction X). Accordingly, the optical device 200, the power supply portion 310, and the controller 320 can be efficiently disposed in the space in the casing 100.

A layout of the optical device 200 and the electronic device 300 is not limited to the layout according to the present embodiment. For example, at least a part of the electronic device 300 may be aligned with the optical device 200 from the first side surface 114 (window portion 130) side (frontward, that is, the positive direction of the first direction X) toward the opposite side (fourth side surface 124 side) (rearward, that is, the negative direction of the first direction X) to the first side surface 114 (window portion 130). For example, both of the power supply portion 310 and the controller 320 may be disposed behind the optical device 200 (the negative direction of the first direction X), or the power supply portion 310 and the controller 320 may be respectively disposed in the region where the controller 320 is disposed and the region where the power supply portion 310 is disposed in the present embodiment.

The power supply portion 310 includes a plurality of (three) power supply boards 312. Each of the power supply boards 312 has a thickness along a direction (first direction X) from the first side surface 114 (window portion 130) side (frontward, that is, the positive direction of the first direction X) toward the opposite side (fourth side surface 124 side) (rearward, that is, the negative direction of the first direction X) to the first side surface 114 (window portion 130). The plurality of power supply boards 312 are aligned along a direction (first direction X) from the first side surface 114 (window portion 130) side (frontward, that is, the positive direction of the first direction X) toward the opposite side (fourth side surface 124 side) (rearward, that is, the negative direction of the first direction X) to the first side surface 114 (window portion 130). In this case, each power supply board 312 can be efficiently disposed in the space in the casing 100 compared with a case where each power supply board 312 has a thickness along a direction (for example, the third direction Z) different from the first direction X. The number of power supply boards 312 included in the power supply portion 310 may not be three, but may be only one or two, or may be four or more. Each power supply board 312 may have a thickness along a direction (for example, the third direction Z) different from the first direction X.

The power supply board 312 is supported by a first support member 332. The first support member 332 is fixed to an inner surface of the casing 100 (first portion 110) at the frontward (the positive direction side of the first direction X) of the space in the casing 100. A fixing tool such as a screw that penetrates through the power supply board 312 from the rear (the negative direction of the first direction X) to the front (the positive direction of the first direction X) of the casing 100 is attachable to the first support member 332. Accordingly, the power supply board 312 can be fixed to the first support member 332 via the fixing tool.

The controller 320 includes a plurality of (two) control boards 322. Each of the control boards 322 has a thickness along a direction (first direction X) from the first side surface 114 (window portion 130) side (frontward, that is, the positive direction of the first direction X) toward the opposite side (fourth side surface 124 side) (rearward, that is, the negative direction of the first direction X) to the first side surface 114 (window portion 130). The plurality of control boards 322 are aligned along a direction (first direction X) from the first side surface 114 (window portion 130) side (frontward, that is, the positive direction of the first direction X) toward the opposite side (fourth side surface 124 side) (rearward, that is, the negative direction of the first direction X) to the first side surface 114 (window portion 130). In this case, each control board 322 can be efficiently disposed in the space in the casing 100 compared with a case where each control board 322 has a thickness along a direction (for example, the third direction Z) different from the first direction X. The number of control boards 322 included in the controller 320 may not be two, but may be only one, or may be three or more. Each control board 322 may have a thickness along a direction (for example, the third direction Z) different from the first direction X.

The control board 322 is supported by a second support member 334. The second support member 334 is fixed to an inner bottom surface of the casing 100 (first portion 110) at the lower side (the negative direction side of the third direction Z) of the space in the casing 100. A fixing tool such as a screw that penetrates through the control board 322 from the rear (the negative direction of the first direction X) to the front (the positive direction of the first direction X) of the casing 100 is attachable to the second support member 334. Accordingly, the control board 322 can be fixed to the second support member 334 via the fixing tool.

The power supply terminal 314 is provided on the opposite side (the negative direction side of the first direction X with respect to the controller 320) of the casing 100 (first portion 110) to the power supply portion 310 with respect to the controller 320. In other words, when viewed from the third direction Z, the power supply terminal 314 is located in a region aligned with the power supply portion 310 in the first direction X. In this case, compared with a case where the power supply portion 310 and the power supply terminal 314 are offset from each other in the second direction Y, for example, a distance between the power supply portion 310 and the power supply terminal 314 can be reduced, and thus a total length of the power supply wiring 316 that will be described later can be reduced. However, disposition of the power supply terminal 314 is not limited to the disposition according to the present embodiment. For example, the power supply terminal 314 may be offset from the power supply portion 310 in the second direction Y. In this case, the power supply terminal 314 may be located, for example, at the center of the first portion 110 of the casing 100 in the second direction Y, or may be offset from the center of the first portion 110 of the casing 100 in the second direction Y toward the positive direction of the second direction Y.

The control terminal 324 is adjacent to the power supply terminal 314 in the second direction Y. In the present embodiment, the control terminal 324 is located on the positive direction side of the second direction Y with respect to the power supply terminal 314. However, a layout of the power supply terminal 314 and the control terminal 324 is not limited to the layout according to the present embodiment. For example, the control terminal 324 may be located on the negative direction side of the second direction Y with respect to the power supply terminal 314.

The power supply terminal 314 and the control terminal 324 are respectively electrically connected to the power supply portion 310 and the controller 320 via the power supply wiring 316 and the control wiring 326. The controller 320 (control board 322) has a notch 322a. The power supply wiring 316 passes through the notch 322a of the controller 320. For example, in order to connect the power supply wiring 316 to the power supply portion 310 and the power supply terminal 314 in a case where the notch 322a is not provided (for example, in a case where the control board 322 has a rectangular shape), it is necessary to detour the power supply wiring 316 with respect to the power supply portion 310 or move the power supply portion 310 in the second direction Y or the third direction Z such that a space for passing the power supply wiring 316 is formed. In a case where the power supply wiring 316 is detoured with respect to the power supply portion 310, a total length of the power supply wiring 316 may be increased. In a case where the power supply portion 310 is moved in the second direction Y or the third direction Z, a space for disposing the power supply portion 310 may be increased. In contrast, in the present embodiment, it is not necessary to detour the power supply wiring 316 with respect to the power supply portion 310, and a total length of the power supply wiring 316 can be reduced. In the present embodiment, it is not necessary to move the power supply portion 310 in the second direction Y or the third direction Z, and a space for disposing the power supply portion 310 can be reduced. However, the control board 322 may not have the notch 322a, and may have, for example, a rectangular shape.

Figure 8:
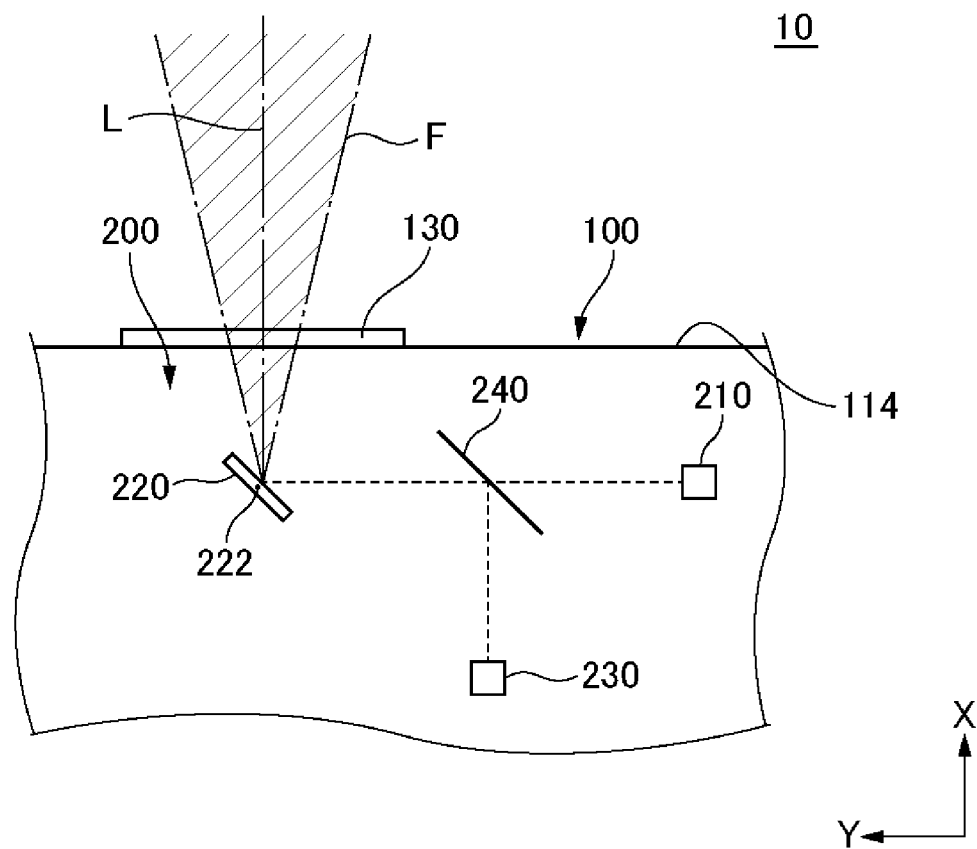
FIG. 8 is a diagram for describing an example of an operation of the optical device accommodated in the casing described with reference to FIGS. 1 to 7.

FIG. 8 is a diagram for describing an example of an operation of the optical device 200 accommodated in the casing 100 described with reference to FIGS. 1 to 7. The first direction X and the second direction Y in FIG. 8 are the same as the first direction X and the second direction Y in FIGS. 1 to 7, respectively.

An example of an operation of the optical device 200 will be described with reference to FIG. 8 along with reference to FIGS. 1 to 7.

The optical device 200 includes a transmitting portion 210, a movable reflection portion 220, a receiving portion 230, and a beam splitter 240. In FIG. 8, the transmitting portion 210, the movable reflection portion 220, the receiving portion 230, and the beam splitter 240 are schematically located in one plane parallel to both of the first direction X and the second direction Y. However, in an actual layout, the transmitting portion 210, the movable reflection portion 220, the receiving portion 230, and the beam splitter 240 may not be located in one plane parallel to both of the first direction X and the second direction Y, or may be located in one plane parallel to both of the first direction X and the second direction Y.

In FIG. 8, electromagnetic waves propagating through the transmitting portion 210, the movable reflection portion 220, the receiving portion 230, and the beam splitter 240 are indicated by dashed lines.

The transmitting portion 210 transmits an electromagnetic wave. In one example, the electromagnetic wave transmitted by the transmitting portion 210 is light, specifically, infrared rays. However, an electromagnetic wave transmitted by the transmitting portion 210 may be light (for example, visible light or ultraviolet rays) having a wavelength different from the wavelength of infrared rays, or may be an electromagnetic wave (for example, radio wave) having a wavelength different from the wavelength of light. In one example, the transmitting portion 210 transmits a pulse wave. However, the transmitting portion 210 may transmit a continuous wave (CW). In one example, the transmitting portion 210 is an element (for example, a laser diode (LD)) capable of converting electrical energy (for example, current) into an electromagnetic wave.

The electromagnetic wave transmitted from the transmitting portion 210 passes through the beam splitter 240, enters the movable reflection portion 220, and is reflected by the movable reflection portion 220. The movable reflection portion 220 is, for example, a micro electro mechanical systems (MEMS) mirror.

The electromagnetic wave reflected by the movable reflection portion 220 passes through the window portion 130 and is emitted toward the outside of the sensor device 10. The electromagnetic wave emitted toward the outside of the sensor device 10 is incident to an object (not shown in FIG. 8) located outside the sensor device 10 and is reflected by the object. The electromagnetic wave reflected or scattered by an object passes through the window portion 130 and enters the movable reflection portion 220. The electromagnetic wave incident to the movable reflection portion 220 enters the receiving portion 230 through reflection by the movable reflection portion 220 and reflection by the beam splitter 240 in order. The receiving portion 230 receives the electromagnetic wave incident to the receiving portion 230. In one example, the receiving portion 230 is an element (for example, an avalanche photodiode (APD)) capable of converting electromagnetic waves into electrical energy (for example, current).

The sensor device 10 is, for example, light detection and ranging (LIDAR). In one example, the sensor device 10 measures a distance between the sensor device 10 and the object located outside the sensor device 10 on the basis of time of flight (ToF). In this example, the sensor device 10 measures the distance on the basis of a difference between the time at which the electromagnetic wave is transmitted from the sensor device 10 (for example, the time at which the electromagnetic wave is transmitted from the transmitting portion 210) and the time at which the electromagnetic wave transmitted from the sensor device 10 and reflected by an object located outside the sensor device 10 is received by the sensor device 10 (for example, the time at which the electromagnetic wave is received by the receiving portion 230).

The optical device 200 has a field of view F that expands along a horizontal direction (a direction along a plane parallel to both of the first direction X and the second direction Y). Specifically, the movable reflection portion 220 is swingable around an axis 222. The axis 222 extends along the third direction Z. The field of view F of the optical device 200 is determined according to the maximum swing angle of the movable reflection portion 220. When a swing angle of the movable reflection portion 220 is 0 degrees, the electromagnetic wave transmitted from the transmitting portion 210 and reflected by the movable reflection portion 220 passes in a straight line L. In a case where the movable reflection portion 220 swings counterclockwise by the maximum swing angle of the optical device 200 when viewed from the positive direction of the third direction Z, the electromagnetic wave transmitted from the transmitting portion 210 and reflected by the movable reflection portion 220 passes in one end of the field of view F (the left end of the field of view F in FIG. 8). In a case where the movable reflection portion 220 swings clockwise by the maximum swing angle of the optical device 200 when viewed from the positive direction of the third direction Z, the electromagnetic wave transmitted from the transmitting portion 210 and reflected by the movable reflection portion 220 passes in the other end of the field of view F opposite to the one end (the right end of the field of view F in FIG. 8).

The optical device 200 may have a field of view expanding not only along the horizontal direction (the direction along the plane parallel to both of the first direction X and the second direction Y) but also along a direction (for example, a vertical direction (for example, a direction along a plane parallel to both of the first direction X and the third direction Z)). Alternatively, the optical device 200 may have a field of view expanding along a direction (for example, a vertical direction (for example, a direction along a plane parallel to both of the first direction X and the third direction Z)) instead of the horizontal direction (the direction along the plane parallel to both of the first direction X and the second direction Y). That is, the optical device 200 may have a predetermined field of view that expands along at least one direction.

For example, in a case where the optical device 200 has a field of view that expands along a vertical direction (a direction along a plane parallel to both of the first direction X and the third direction Z), the movable reflection portion 220 is swingable around an axis to extend in the second direction Y. That is, the movable reflection portion 220 is swingable around at least one axis according to the expansion of the field of view of the optical device 200.

As shown in FIGS. 3 and 4, an outer surface of the casing 100 is provided with a first shape portion 152 and a second shape portion 154. The first shape portion 152 and the second shape portion 154 are engageable with other shape portions located outside the casing 100 (details of a relationship between the first shape portion 152 or the second shape portion 154 and other shape portions located outside the casing 100 will be described later). The field of view F can be positioned (fixed) by the first shape portion 152 and the second shape portion 154. Specifically, when viewed from the third direction Z (that is, a direction perpendicular to the direction in which the field of view F expands, or the extension direction of the axis 222), the first shape portion 152 and the second shape portion 154 are aligned on the same straight line as the straight lines L (that is, when viewed from the third direction Z, a virtual straight line passing through the center of the field of view F of the optical device 200, or a virtual straight line through which an electromagnetic wave reflected by the movable reflection portion 220 at a swing angle of 0 degrees passes). Accordingly, by engaging the first shape portion 152 and the second shape portion 154 (that is, engagement portions) with other shape portions (that is, engagement portions) located outside the casing 100, the casing 100 can be prevented from rotating around the third direction Z, and thus the field of view F (that is, the straight line L) is positioned (fixed). Since the first shape portion 152 and the second shape portion 154 are aligned on the same straight line as the straight line L when viewed from the third direction Z, a user of the sensor device 10 can use the first shape portion 152 and the second shape portion 154 as a mark to recognize a position of the center of the field of view F of the optical device 200.

The first shape portion 152 and the second shape portion 154 may be deviated from the straight line L in the second direction Y when viewed from the third direction Z instead of being arranged on the same straight line as the straight line L. That is, the first shape portion 152 and the second shape portion 154 may be aligned parallel to the straight line L when viewed from the third direction Z. Even in this case, by engaging the first shape portion 152 and the second shape portion 154 with other shape portions located outside the casing 100, the casing 100 can be prevented from rotating around the third direction Z, and thus the field of view F is positioned.

Each of the first shape portion 152 and the second shape portion 154 is a recess. Accordingly, compared with the case where each of the first shape portion 152 and the second shape portion 154 is a protrusion, it is possible to reduce a probability that the first shape portion 152 and the second shape portion 154 may be in contact with and interface with an external element of the casing 100. However, each of the first shape portion 152 and the second shape portion 154 may be a protrusion. Also in this case, the first shape portion 152 and the second shape portion 154 can be engaged with other shape portions located outside the casing 100. One of the first shape portion 152 and the second shape portion 154 may be a recess, and the other of the first shape portion 152 and the second shape portion 154 may be a protrusion. That is, the first shape portion 152 and the second shape portion 154 may be a recess or a protrusion independently of one another.

The other shape portions that are located outside the casing 100 and engage with the first shape portion 152 and the second shape portion 154 may be recesses or protrusions depending on whether the first shape portion 152 and the second shape portion 154 are recesses or protrusions. For example, when the first shape portion 152 (second shape portion 154) is a recess (for example, a positioning hole), the other shape portion located outside the sensor device 10 is a protrusion (for example, a positioning pin). On the other hand, when the first shape portion 152 (second shape portion 154) is a protrusion (for example, a positioning pin), the other shape portion located outside the sensor device 10 may be a recess (for example, a positioning hole).

The first shape portion 152 and the second shape portion 154 are provided on the bottom surface (first surface 112) of the casing 100 (first portion 110). In this case, the field of view F can be positioned only by mounting the casing 100 on a mounting surface provided with other shape portions that engage with the first shape portion 152 and the second shape portion 154. Accordingly, the field of view F is easily positioned. However, the first shape portion 152 and the second shape portion 154 may be provided on a surface different from the bottom surface (first surface 112) of the casing 100 (first portion 110). The first shape portion 152 and the second shape portion 154 may be provided on a common surface of the casing 100 such as both of the first shape portion 152 and the second shape portion 154 being provided on the first surface 112 of the casing 100 (first portion 110) as in the present embodiment. Alternatively, the first shape portion 152 and the second shape portion 154 may be provided on different surfaces such as, for example, the first shape portion 152 being provided on the first surface 112 of the casing 100 (first portion 110) and the second shape portion 154 being provided on the second surface 122 of the casing 100 (second portion 120).

The first shape portion 152 is located on the rear side of the casing 100 (the negative direction side of the first direction X) with respect to the second shape portion 154. The first shape portion 152 is located in the rear of the casing 100 (negative direction of the first direction X) rather than in the front of the casing 100 (positive direction of the first direction X). The first shape portion 152 (recess) is provided at the intersection between the bottom surface (first surface 112) of the casing 100 (first portion 110) and the outer side surface (the outer side surface provided with the power supply terminal 314 and the control terminal 324) of the casing 100 (first portion 110). The second shape portion 154 is located on the front side of the casing 100 (the positive direction side of the first direction X) with respect to the first shape portion 152. The second shape portion 154 is located in the front of the casing 100 (positive direction in the first direction X) rather than in the rear of the casing 100 (negative direction in the first direction X). The second shape portion 154 is offset from the front side surface (first side surface 114) toward the rear side (negative direction of the first direction X) of the casing 100 (first portion 110). However, the second shape portion 154 (recess) may be provided at the intersection between the bottom surface (first surface 112) of the casing 100 (first portion 110) and the outer side surface (first side surface 114) of the casing 100 (first portion 110) in the same manner as the first shape portion 152. That is, at least one of the first shape portion 152 and the second shape portion 154 may be provided at the intersection between the bottom surface (for example, the first surface 112) of the casing 100 and the outer side surface (for example, the first side surface 114 or the surface provided with the power supply terminal 314 and the control terminal 324) of the casing 100.

In the present embodiment, a field of view (field of view F) when viewed from the third direction Z is positioned by the first shape portion 152 and the second shape portion 154. However, a field of view when viewed from a direction different from the third direction Z, such as the second direction Y may also be positioned by using the first shape portion 152 and the second shape portion 154 according to the same method as the method described in the present embodiment.

Figure 9:
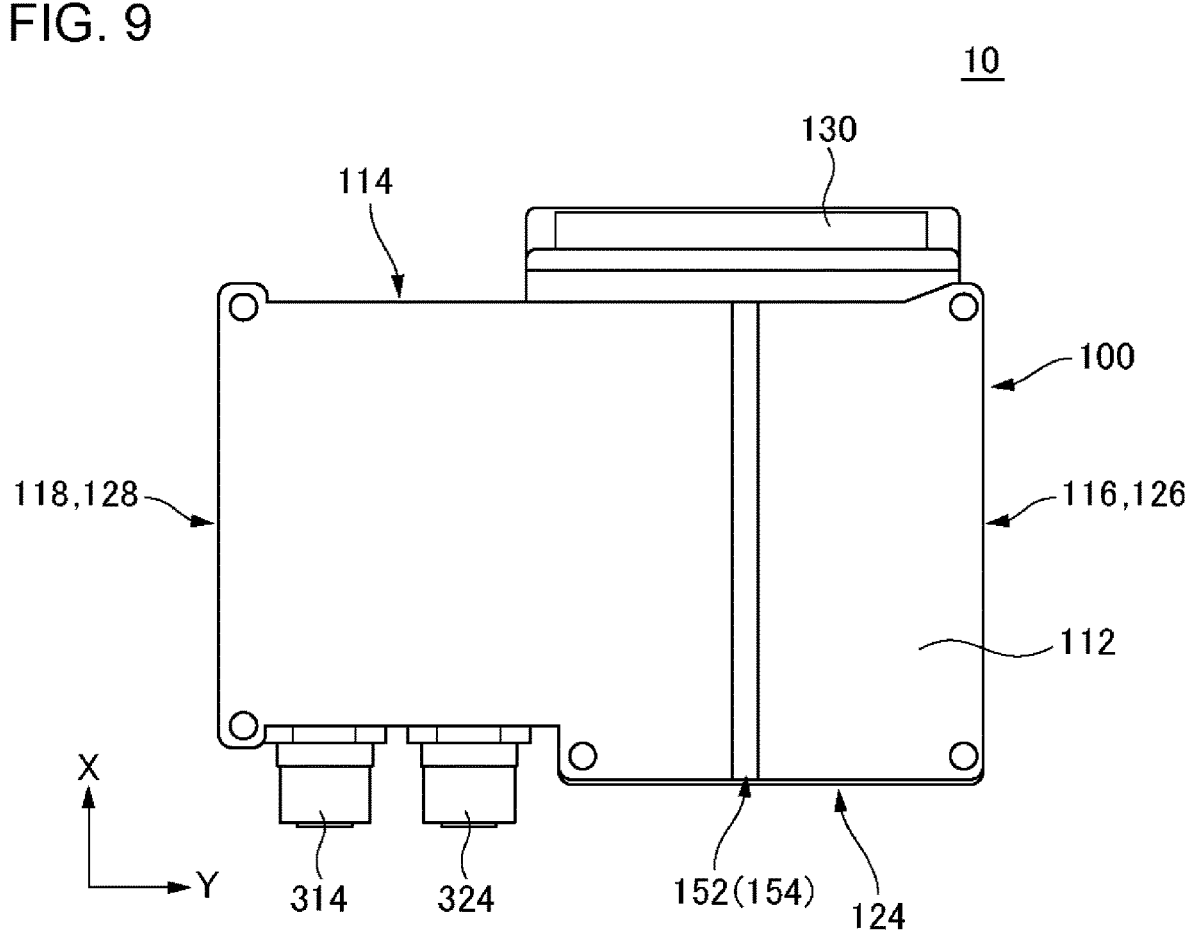
FIG. 9 is a diagram showing a modification example of FIG. 3.

FIG. 9 is a diagram showing a modification example of FIG. 3.

The first shape portion 152 (second shape portion 154) (for example, a recess or a protrusion) may extend along the first direction X. In the example shown in FIG. 9, a length of the first shape portion 152 (second shape portion 154) in the first direction X is larger than a width of the first shape portion 152 (second shape portion 154) in the second direction Y. Also in this case, by engaging the first shape portion 152 (second shape portion 154) with other shape portion that is located outside the casing 100 and is long in one direction, the casing 100 can be prevented from rotating around the third direction Z, and thus the field of view F is positioned.

Although the embodiments and modification examples have been described above with reference to the drawings, these are examples of the present invention, and various configurations other than the above may be employed.

For example, in the present embodiment, the first portion 110 and the second portion 120 of the casing 100 are respectively a lower portion and an upper portion of the casing 100. However, the first portion 110 and the second portion 120 of the casing 100 may be respectively, for example, an upper portion and a lower portion of the casing 100.

In the present embodiment, the casing 100 accommodates both of the optical device 200 and the electronic device 300. However, the casing 100 may accommodate only the optical device 200, and the electronic device 300 may be provided outside the casing 100.

In the present embodiment, the first portion 110 and the second portion 120 of the casing 100 are separable obliquely with respect to the first surface 112 or the second surface 122 of the casing 100. However, the first portion 110 and the second portion 120 of the casing 100 may be separable in parallel to the first surface 112 or the second surface 122 of the casing 100.

This application claims priority based on Japanese Patent Application No. 2019-221929 filed on Dec. 9, 2019, the disclosure of which is incorporated by reference in its entirety.

REFERENCE SIGNS LIST

10: sensor device
100: casing
110: first portion
112: first surface
114: first side surface
116: second side surface
118: third side surface
120: second portion
122: second surface
124: fourth side surface
126: fifth side surface
128: sixth side surface
130: window portion
140: sealing member
152: first shape portion
154: second shape portion
200: optical device
210: transmitting portion
220: movable reflection portion
222: axis
230: receiving portion
240: beam splitter
300: electronic device
310: power supply portion
312: power supply board
314: power supply terminal
316: power supply wiring
320: controller
322: control board
322a: notch
324: control terminal
326: control wiring
332: first support member
334: second support member F: field of view
L: straight line
X: first direction
Y: second direction
Z: third direction

The invention claimed is:

1. A sensor device comprising:
a casing provided with a window portion; and
an optical device accommodated in the casing, the optical device scanning an object with an electromagnetic wave transmitted through the window portion by using a movable reflection portion swingable around at least one axis, wherein
an outer surface of the casing is provided with a first shape portion that is a recess or a protrusion and a second shape portion that is a recess or a protrusion,
when viewed from an extension direction of the one axis of the movable reflection portion, the second shape portion is aligned with the first shape portion on a same straight line as a virtual straight line through which the electromagnetic wave reflected by the movable reflection portion at a swing angle of 0 degrees passes, or along a direction parallel to the virtual straight line, and
the first shape portion and the second shape portion are provided on a bottom surface of the outer surface of the casing.

2. A sensor device comprising:
a casing provided with a window portion; and
an optical device accommodated in the casing, the optical device scanning an object with an electromagnetic wave transmitted through the window portion, the optical device having a field of view that expands along at least one direction, wherein
an outer surface of the casing is provided with a first shape portion that is a recess or a protrusion and a second shape portion that is a recess or a protrusion,
when viewed from a direction perpendicular to the one direction, the second shape portion is aligned with the first shape portion on a same straight line as a virtual straight line passing through a center of the field of view of the optical device, or along a direction parallel to the virtual straight line, and
the first shape portion and the second shape portion are provided on a bottom surface of the outer surface of the casing.

3. The sensor device according to claim 2, wherein
at least one of the recess which is the first shape portion and the recess which is the second shape portion is provided at an intersection between the bottom surface of the outer surface of the casing and an outer side surface of the outer surface of the casing.

4. A sensor device comprising:
a casing provided with a window portion; and
an optical device accommodated in the casing, the optical device scanning an object with an electromagnetic wave transmitted through the window portion, the optical device having a field of view that expands along at least one direction, wherein
an outer surface of the casing is provided with a first shape portion that is a recess or a protrusion and a second shape portion that is a recess or a protrusion,
when viewed from a direction perpendicular to the one direction, the second shape portion is aligned with the first shape portion on a same straight line as a virtual straight line passing through a center of the field of view of the optical device, or along a direction parallel to the virtual straight line, and
the first shape portion and the second shape portion are engageable with other shape portions that are protrusions or recesses located outside the casing.

5. The sensor device according to claim 1, wherein
at least one of the recess which is the first shape portion and the recess which is the second shape portion is provided at an intersection between the bottom surface of the outer surface of the casing and an outer side surface of the outer surface of the casing.

6. The sensor device according to claim 4, wherein
at least one of the recess which is the first shape portion and the recess which is the second shape portion is provided at an intersection between a bottom surface of the outer surface of the casing and an outer side surface of the outer surface of the casing.

* * * * *